US009344427B1

(12) United States Patent
Mehta et al.

(10) Patent No.: US 9,344,427 B1
(45) Date of Patent: May 17, 2016

(54) FACILITATING MULTIPLE AUTHENTICATIONS

(71) Applicant: Amazon Technologies, Inc., Seattle, WA (US)

(72) Inventors: Gaurang Pankaj Mehta, Seattle, WA (US); Chirag Pravin Pandya, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 3 days.

(21) Appl. No.: 14/538,187

(22) Filed: Nov. 11, 2014

(51) Int. Cl.
*H04L 29/06* (2006.01)

(52) U.S. Cl.
CPC .......... *H04L 63/083* (2013.01); *H04L 63/0428* (2013.01); *H04L 63/0884* (2013.01)

(58) Field of Classification Search
CPC .............. H04L 63/083; H04L 63/0428; H04L 63/0884
See application file for complete search history.

(56) References Cited

U.S. PATENT DOCUMENTS

| | | | | |
|---|---|---|---|---|
| 6,055,637 A * | 4/2000 | Hudson | ............... | G06F 21/6218 709/225 |
| 7,921,290 B2 * | 4/2011 | Albert | ..................... | G06F 21/31 713/168 |
| 8,434,133 B2 * | 4/2013 | Kulkarni | ................. | G06F 21/33 726/4 |
| 2006/0041932 A1 * | 2/2006 | Cromer | ................. | H04L 9/3226 726/6 |
| 2011/0202757 A1 * | 8/2011 | Nakagawa | .............. | G06F 21/33 713/153 |
| 2014/0143845 A1 * | 5/2014 | Roy | ........................ | G06F 21/60 726/6 |
| 2014/0181520 A1 * | 6/2014 | Wendling | ........... | G06Q 20/3572 713/169 |

OTHER PUBLICATIONS

Jafari, "The registration confirmation email contains my password: do they keep it in plaintext? Information Security Stack Exchange", 3 pages, Jun. 17, 2014, retrieved from http://security.stackexchange.com/questions/61215/theregistrationconfirmationemailcontainsmy-passworddotheykeepitinpla?rq=1 on Dec. 13, 2015.*
Florencio, "Password Portfolios and the Finite-Effort User:Sustainably Managing Large Numbers of Accounts", 16 pp,USENIX Security, Aug. 20-22, 2014.*
Bucicoiu, "Secure Cloud Video Streaming Using Tokens", Sep. 11, 2014 (pp. 1-6). IEEE.*

* cited by examiner

*Primary Examiner* — Saleh Najjar
*Assistant Examiner* — Oleg Korsak
(74) *Attorney, Agent, or Firm* — Lee & Hayes, PLLC

(57) ABSTRACT

Techniques and constructs to facilitate multiple authentications of passwords are described. For instance, the disclosure describes systems and processes that authenticate a password and return an encrypted password that may be subsequently decrypted for additional authentications.

20 Claims, 6 Drawing Sheets

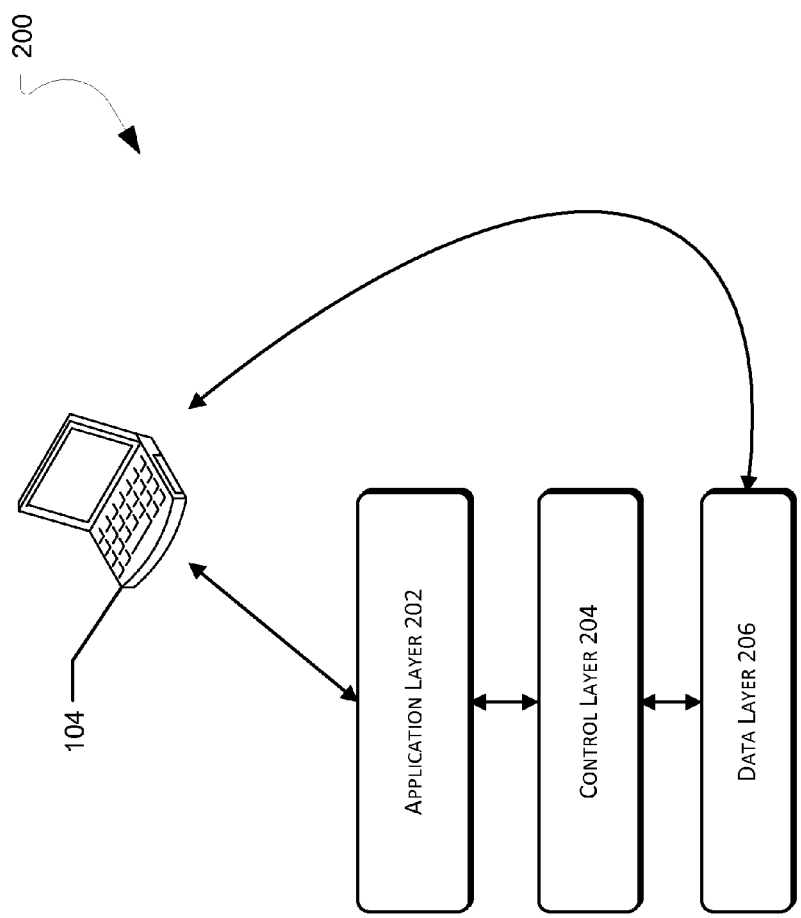

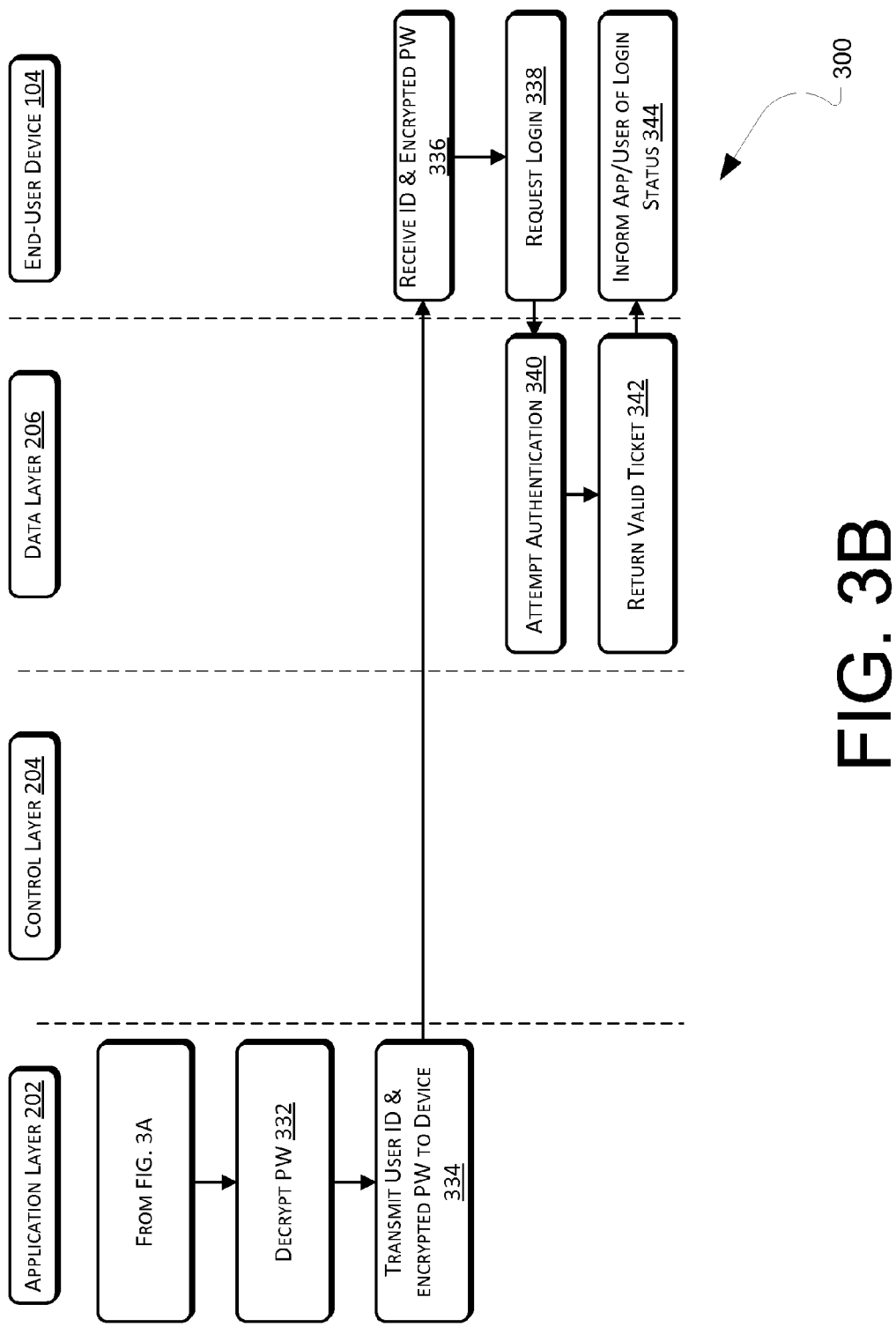

FACILITATING MULTIPLE AUTHENTICATIONS

BACKGROUND

Individuals and organizations are using an increasing number of applications and services, and rely on, create and store increasing amounts of data. Maintaining on-premises data servers to host these applications and services and to store these data can be burdensome. Computing resource providers, including web-services providers, for example, may ease this burden by providing off-premises managed directory services. In some conventional implementations, such services include a system that stores, organizes, and provides access to information in a computer operating system's directory. The system can be implemented by a centrally-managed data server that is located remotely (relative to the organization/user). The centrally-managed data server may provide access to the managed directory service via a network, for example, the Internet, using network-enabled client devices associated with the individual/organization. Such a system provides a directory service without having to install or maintain the infrastructure otherwise required used to implement the directory service on-premises.

Using such a centrally-managed data server may require additional security features. For example, it may be important to ensure that the directories are accessed only by authorized users. One approach to this enhanced security has been to provide users with passwords that are authenticated by the managed directory service. In some conventional systems, this authentication is required multiple times for the same client device. For example, a user may be required to enter credentials, such as a password once upon accessing a directory through a hosted service or application (for example, through a virtual desktop) and again upon accessing a directory (even the same directory) directly over a network connection. This entry and re-entry of credentials provides an added security feature, but may be undesirable to a user, specifically when the user has not changed machines.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2 illustrates a block diagram of an example implementation of a computing resource provider system according to implementations of this disclosure.

FIGS. 3A and 3B illustrate a flow diagram of an example authentication process according to implementations of this disclosure.

DETAILED DESCRIPTION

Figure 1:
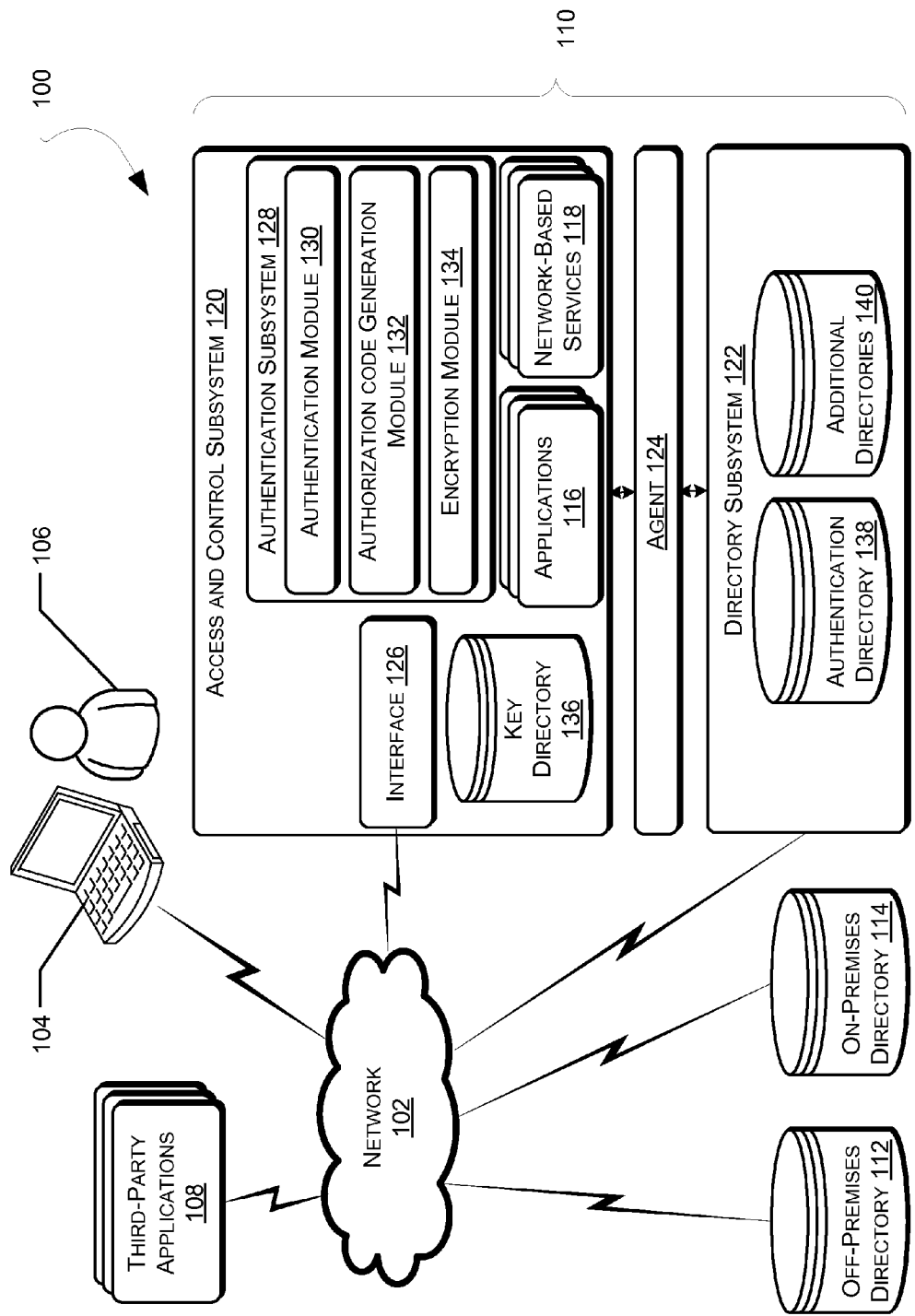
FIG. 1 illustrates an example network environment in which directory management features of the present disclosure can be implemented.

The present disclosure includes systems and processes for authenticating users in a managed directory service, which may be a remote directory service, such as a cloud-based directory service. As noted above, some applications associated with remote directory services (e.g., which access directories managed by the remote directory services) require multiple authentications of the same user credentials. For instance, some applications may require a user device to authenticate user credentials through the application (e.g., to initiate a session with the application) and independently of the application. In one example implementation, a virtual desktop application may require that a user first authenticate a password to initiate the virtual desktop application, and authenticate the password a second time to communicate directly with directories associated with the user, despite those directories already being accessible via the virtual desktop. Implementations of systems and methods described herein may facilitate multiple authentications of user credentials, with a single presentation of the credentials.

In one aspect, an example method according to this disclosure can include receiving, at a computing resource service provider via an application accessed by a user device, (i) a request to access a service and (ii) a user name and password associated with the user name for authentication to access the service. The method also may include obtaining a first authentication of the user name and the password associated with the user name. The first authentication may be obtained using an authentication directory accessible by the computing resource provider. The authentication directory may be one of a plurality of directories accessible by the computing resource provider. The method may also include encrypting the password associate with the user name to create an encrypted password and transmitting the encrypted password to the application accessed by the user device. The encryption may be carried out at least partly in response to obtaining the first authentication. In the example method, the user device is configured to access the plurality of directories independent of the computing resource services provider, the encrypted password is decrypted by the application, and the decrypted password is presented to the authentication directory independent of the computing resource service provider.

In some implementations, the authentication directory may be a key distribution center, and the authorization may be obtained upon the key distribution center minting a ticket. For example, the key distribution center may be a Kerberos key distribution center and the ticket may be a Kerberos ticket.

In another aspect, the disclosure may be embodied as a distributed system made up of a plurality of layers. More specifically, the layers can include a control layer accessible by a user device via an application and a data layer comprising a plurality of directories, including at least an authentication directory. The data layer is accessible by the application via the control layer, upon a first authentication of user credentials, and by the user device independently of the control layer, upon a second authentication of the user credentials. In some implementations, the control layer may include one or more computing devices and may be programmed to implement a network interface, an authentication module, and an encryption module. The network interface receives, from the application, (i) a request to access a service and (ii) user credentials associated with the user device requesting access to the service. The authentication module obtains the first authentication of the user device from the authentication directory. The encryption module, at least partly in response to obtaining the first authentication of the user credentials, encrypts at least a portion of the user credentials to create encrypted user credentials. The network interface also transmits the encrypted user credentials to the application. The encrypted user credentials are decrypted and presented to the data layer, e.g., by the user device, to obtain the second authentication.

In general, the systems and methods described herein may provide for multiple authentications of a user without requiring repeated input of the user's credentials.

These and numerous other aspects of the disclosure are described below with reference to the drawings. The architectures, systems, and processes described herein may be implemented in a variety of different ways, and the below description and accompanying Figures are for illustrative purposes, intended only to provide example implementations and techniques.

One or more examples described herein provide processes for obtaining multiple authentications of user credentials. In various instances, a processing unit, or units, may be configured via programming from modules or APIs to perform the techniques, or processes, as described herein. The processing unit, or units, may include one or more of a GPU, a field-programmable gate array (FPGA), another class of digital signal processor (DSP), or other hardware logic components that may, in some instances, be driven by the CPU. For example, and without limitation, illustrative types of hardware logic components that may be used include Application-Specific Integrated Circuits (ASICs), Application-Specific Standard Products (ASSPs), System-on-a-chip systems (SOCs), Complex Programmable Logic Devices (CPLDs), etc.

FIG. 1 illustrates a detailed example of a network environment 100 in which access management features of the present disclosure can be implemented. As illustrated, the network environment 100 generally includes one or more networks 102 allowing for operable communication between a user device 104 operable by a user 106, third-party application servers 108, a computing resource service provider system 110, and directories including off-premises directories 112 and on-premises directories 114.

The network 102 may include public networks such as the Internet, private networks such as an institutional and/or a personal intranet, or some combination of private and public networks. The network 102 may also include any type of wired network, wireless network, or a combination thereof. Further, the wireless network may include, for example, a satellite network, a cellular network (e.g., 3G, 4G, etc.), a Wi-Fi network, a WiMax network, another wireless network, or a combination thereof. Moreover, the wired network may include an Ethernet connected via Cat-5 or similar cable, twisted pair telephone lines, coaxial cable, fiber optic cable, or a combination thereof. In another implementation, the network 102 may be a wide area network (WAN), a local area network (LAN), or a combination thereof. Further, the network 102 may include a plain-old telephone service (POTS) network.

The network 102 may utilize communications protocols, including packet-based and/or datagram-based protocols such as internet protocol (IP), transmission control protocol (TCP), user datagram protocol (UDP), or other types of protocols. Moreover, the network 102 may also include a number of devices that facilitate network communications and/or form a hardware basis for the networks, such as switches, routers, gateways, access points, firewalls, base stations, repeaters, backbone devices, and the like.

In some examples, the network 102 may further include one or more devices that enable connection to a wireless network, such as a wireless access point (WAP). Some examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

The single user device 104 illustrated in FIG. 1 is understood to represent any number of user devices. The user device(s) 104 may belong to a variety of categories or classes of devices, which may include traditional client-type devices, desktop computer-type devices, mobile-type devices, special purpose-type devices, embedded-type devices, and/or wearable-type devices. Further, the user device(s) may include a diverse variety of device types and are not limited to any particular type of device.

For example, the user device(s) 104 may also include, but are not limited to, computer navigation type client computing devices such as satellite-based navigation systems including global positioning system (GPS) devices and other satellite-based navigation system devices, telecommunication devices such as mobile phones, tablet computers, mobile phone tablet hybrid, personal data assistants (PDAs), laptop computers, other mobile computers, wearable computers, implanted computing devices, desktop computers, personal computers, automotive computers, network-enabled televisions, thin clients, terminals, game consoles, gaming devices, work stations, media players, personal video recorders (PVRs), television set-top boxes, digital video recorders (DVRs), cameras, integrated components for inclusion in a computing device, appliances, or any other sort of computing device configured to receive user input.

The user computing devices 104 may also be associated with a particular organization. For example, an organization may have various user computing devices 104 that remain on-premises, or that are used off-premises primarily by employees or other users associated with the organization. In some embodiments, some or all of the user computing devices 104 may be separate from any organization, such as public computers or home computers that are used by any number of users to perform various tasks, which may include accessing applications using credentials associated with a particular organization or other customer of the computing service provider 110.

The entity 106, which may be as a user, may be associated with each, or any, of the user device(s) 104. The entity may include a particular user and one or more designees of the user such as an assistant of the user, a supervisor of the user, a spouse of the user, a parent of the user, and/or another entity to whom the user grants permission to access the user device(s) 104.

The third-party applications 108 may be applications hosted by application servers accessible by the user device(s) 104. In some implementations, the third-party applications 108 may interact with the computing resource service provider 110, for example, to access directories maintained by a management directory service associated with the computing resource service provider 110, or to allow the computing resource service provider 110 to provide authentication services, as will be described in more detail below. In some examples, the third-party applications may be "trusted" or otherwise approved by the computing resource service provider 110.

The computing resource service provider system 110 can be a computing system configured to host or otherwise provide access to a managed directory service for customer organizations, applications 116, and/or other network-based services and resources 118. For example, the computing resource service provider system 110 can be a server or group of servers that may be accessed via the communication network 102. The computing resource service provider system 110 can include a number of components to provide various features described herein. For example, and as FIG. 1 illustrates, the computing resource service provider system 110 can include an access and control subsystem 120, a directory subsystem 122, and an agent 124 facilitating communication between the access and control subsystem 120 and the directory subsystem 122. In some embodiments, the computing service provider system 110 may include additional or fewer components than those illustrated in FIG. 1.

FIG. 1 also illustrates the directories 112, 114. As used herein, the term "directory" generally refers to an organized collection of data about users, devices, applications, and/or other common resources of a computer network. Each resource on a computer network (or some subset thereof) may be represented as an object in a directory, and information about a particular resource (e.g., name, address, permissions, etc.) can be stored as attributes of that object. Information can be securely stored within or in association with the object such that only users with sufficient permissions are able to access, modify, or otherwise use the information.

Herein, the term "off-premises directory" refers to a directory that is remote from the organization with which it is associated. This is distinguishable from an "on-premises directory," which is located on an organization's premises. Thus, a directory physically stored on the premises of the computing resource service provider system 110, such as one of the directories illustrated as part of the directory subsystem 122 likely is an off-premises directory, because it is off-premises with respect to the organization to which it belongs (e.g., the organization that owns or operates the network described by the directory). FIG. 1 illustrates the directory 112 as an off-premises directory and the directory 114 as an on-premises directory. In implementations of this disclosure, the computing resource service provider system 110 may access any or all of the directories in the directory subsystem 122, the off-premises directory 112, and the on-premises directory 114. As noted above, the computing resource service provider system may host and/or communicate with a managed directory service (e.g., a system that stores, organizes, and provides access to information in a computer operating system's directory, an example of such a directory is MICROSOFT® ACTIVE DIRECTORY®). As will be appreciated, each directory in FIG. 1 is merely illustrative, and may include more directories, stored at the same and/or different locations.

As noted above, the computing resource service provider 110 system generally includes an access and control subsystem 120 and a directory subsystem 122 communicating through an agent 124.

The access and control subsystem 120 may provide access to applications 116 and network-based services 118 hosted by the computing resource service provider system 110, as noted above. For example, the applications 116 and network-based services 118 may facilitate access to and use of virtual desktops for users. In other examples, the applications and services may provide messaging or file-sharing functionality.

The access and control subsystem 120 also includes one or more network interfaces 126 to enable communications between the access and control subsystem 120 and other computing resources or devices via the network 102. The network interface 116 may include one or more network interface controllers (NICs) or other types of transceiver devices to send and receive communications over a network.

The access and control subsystem 120 further may include an authentication subsystem 128 that authenticates users to allow use of the applications 116, network-based services 118, and/or third-party applications 108, as well as access to the directories accessible through or by those applications and/or services. The authentication subsystem includes an authentication module 130, an authorization code generating module 132, and an encryption module 134. The access and control subsystem 120 may further include a key directory 136, which may store keys available to the encryption module 134 to encrypt user credentials.

The authentication module 130 includes logic to program a processing unit to facilitate authentication of user credentials. For example, the authentication module may utilize a directory, such as an authorization directory 138 (described below) that stores user credential information, such as user name/password information. The directory may confirm that the user is authorized to access, e.g., login to, a service or application by comparing an input password to information stored on the directory. In one implementation, the authentication module 130 may check a key distribution center in an attempt to obtain authentication, such as in the form of a Kerberos ticket.

The authorization code generating module 132 includes logic to program a processing unit to generate an authorization code for transmission to the application. The authorization code may confirm that access has been granted. In some embodiments, the authorization code may include, or have associated therewith, additional information. The additional information can include metadata, such as metadata about the user. In other instances, the additional information may include accessibility information, such as information about access rules or policies that affect the user or an identification of directories accessible by the user. In some implementations, the additional information may include credential information, such as a ticket or token, which allows the user access to the applications and/or services cooperating with the access and control subsystem 120. In some examples, the additional information may include an access token and/or a refresh token.

The encryption module 134 includes logic to program a processing unit to encrypt the user credentials authenticated by the authentication module 130. The encryption module 134 may use any of a number of encryption techniques to encrypt the user credentials for subsequent decryption by the application/service being accessed. In an example implementation, the user credentials are encrypted with the public key of a public key/private key pair associated with the application or service being accessed. As noted above, the encryption module may also communicate with the key directory 136 to encrypt the user credentials. For example, the key directory may store one or more keys used to encrypt the user credentials. In the illustrated implementation, the key directory 136 is maintained at the access and control subsystem, although in other embodiments the directory may be stored otherwise, such as at the directory subsystem 122. As will be described in more detail below, the encrypted credentials may be used subsequently to access directories, such as the directory subsystem 122, other than through the access and control subsystem 120.

As illustrated in FIG. 1, the directory subsystem 122 includes an authorization directory 138 and additional directories 140. In some implementations, the authorization directory may store user credentials, such as user name and password information for use by the authentication module 130, discussed above. The additional directories 140 may be any directories managed by the computing resource service provider system 110. Although not illustrated, some or all of the directories illustrated as part of the directory sub-system may alternatively be stored on the off-premises directory 112 and/ or the on-premises directory 114. In these implementations, a connection may exist between the directory subsystem and the off-premises and/or on-premises directories 112, 114. Thus, a query to the directory subsystem may be answered with information retrieved over the connection.

The agent 124 may generally facilitate communication between the access and control subsystem 120 and the directory subsystem 122. In some implementations, the agent may be an abstraction layer that simplifies web service requests at the access and control subsystem 120. For example, the agent may perform Lightweight Directory Access Protocol (LDAP) queries onto the directory subsystem 122, e.g., using LDAP port 389. In some implementations, the agent may also perform requests to a key distribution center, such as to obtain Kerberos tickets.

Although the access and control subsystem 120 and the directory subsystem 122 are illustrated as forming part of a single computing resource service provider system 110, the functionalities and components making up those subsystems may be spread across multiple systems, or performed and stored at different locations. By way of non-limiting example, the access and control subsystem may access directories (e.g., the off-premises directory 112 or the on-premises directory 114) that are not owned or operated by the same entity controlling the directory subsystem.

For simplicity, other components or features that may be typically associated, or included, with a computing resource service provider system such as the computing resource service provider system 110 are omitted from FIG. 1. For example, the computing resource service provider system 110, e.g., the access and control subsystem 120, may also include one or more processing units operably, or electrically, connected to computer-readable media, e.g., via a bus. The computer-readable media may store, as executable instructions, modules comprising the authentication subsystem 128, an operating system and other modules, programs or applications that are loadable and executable by the one or more processing units.

Alternatively, or in addition, the functionally described herein may be performed, at least in part, by one or more hardware logic components such as accelerators. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator may represent a hybrid device, such as one from ZYLEX or ALTERA that includes a CPU course embedded in an FPGA fabric.

Computer-readable media may include computer storage media and/or communication media. Computer storage media may include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 112, 142 may be examples of computer storage media similar to data store 166.

Thus, the computer-readable media 112, 142 and/or data store 166 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), mask read-only memory (MROM), programmable read-only memory (PROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that may be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

FIG. 2 illustrates schematically a system 200 for implementing functions of the environment 100 described in FIG. 1. Logically, the system 200 is represented as three layers in a distributed computing architecture, each of which may implement functions of the environment 100 described herein. The three layers include an application layer 202, a control layer 204, and a data layer 206.

In some implementations, a user, via the user device 104, accesses applications at the application layer 202. The application layer 202 may be accessed by the user via a user interface on the user device 104. The applications may be hosted by the computing resource service provider 110 or may be third-party applications 108. The third-party applications may be approved or otherwise vetted by the computing resource service provider 110.

The control layer 204, among other functions, manages user sessions initiated by requesting a login through the application layer 202. For example, when tokens, e.g., web access or refresh tokens are used in a session, the control layer 204 may manage, e.g., store or access, such tokens. In some implementations, the control layer 204 may identify the directories with which the application or user will communicate, and may also map such identified directories. In one example, the control layer 204 may determine a particular directory to use in authenticating a user. The control layer 204 may also or alternatively determine actions the user is authorized to perform, and authorize such actions. User information may also be stored at the control layer 204, for example, in connection with creating or maintaining a session. The control layer 204 may be implemented in a web services layer.

The data layer 206 is a layer at which directory management is implemented. For example, a portion of the data layer 206 may implement ACTIVE DIRECTORY®. The data layer may include the directory subsystem 122 or connect to other directories, such as the off-premises directory 112 or the on-premises directory 114. Moreover, when the agent 124 is used, the agent is provided on the data layer, for example, to perform LDAP queries on the directories. In example implementations, LDAP operations and ACTIVE DIRECTORY® operations are carried out at the data layer 206.

Moreover, some implementations of the environment 100 support direct access of the user device 104 to the data layer 206. For example, when a user device is joined to a domain, it is joined to that domain directly at the data layer 206.

Although only a single data layer is illustrated, other implementations may include additional, similarly functioning data layers. For example, the implementation 200 may include a data layer 206 for each customer of the computing resource service provider 110.

In some implementations, comparing FIG. 1 to FIG. 2, the application layer 202 may generally include one or more of the third party applications 108, the applications 116, and the network-based services 118, the control layer 204 may include the authentication subsystem 128, and the data layer may include the directory subsystem 122 and the agent 124.

Some implementations of the system 200 allow a user device 104 to create a session with an application or service by providing user credentials at the application layer 202. The application layer 202 passes the user credentials to the control layer 204, which authenticates and manages the session. During the session, the control layer 204 passes requests and queries to the data layer 206, as necessary. The user device 104 may also communicate directly with the data layer, e.g., independently of the control layer. For example, certain applications and services, including some managed desktop computing services and file sharing services, may require a user to access the data layer 206 directly, i.e., independently of the control layer 204.

Instances in which the user device 104 is required to be authenticated at the control layer 204 and directly at the data layer 206 may require a user to present credentials each time it accesses the data layer. So, for example, and implementation of the system 200 may require that the user obtain a first authentication to create a session at the control layer 204, e.g., to access a service or application and underlying directories, and that the user obtain a second authorization to access the data layer directly, independent of the control layer 204, e.g., through the domain.

Figure 3A:
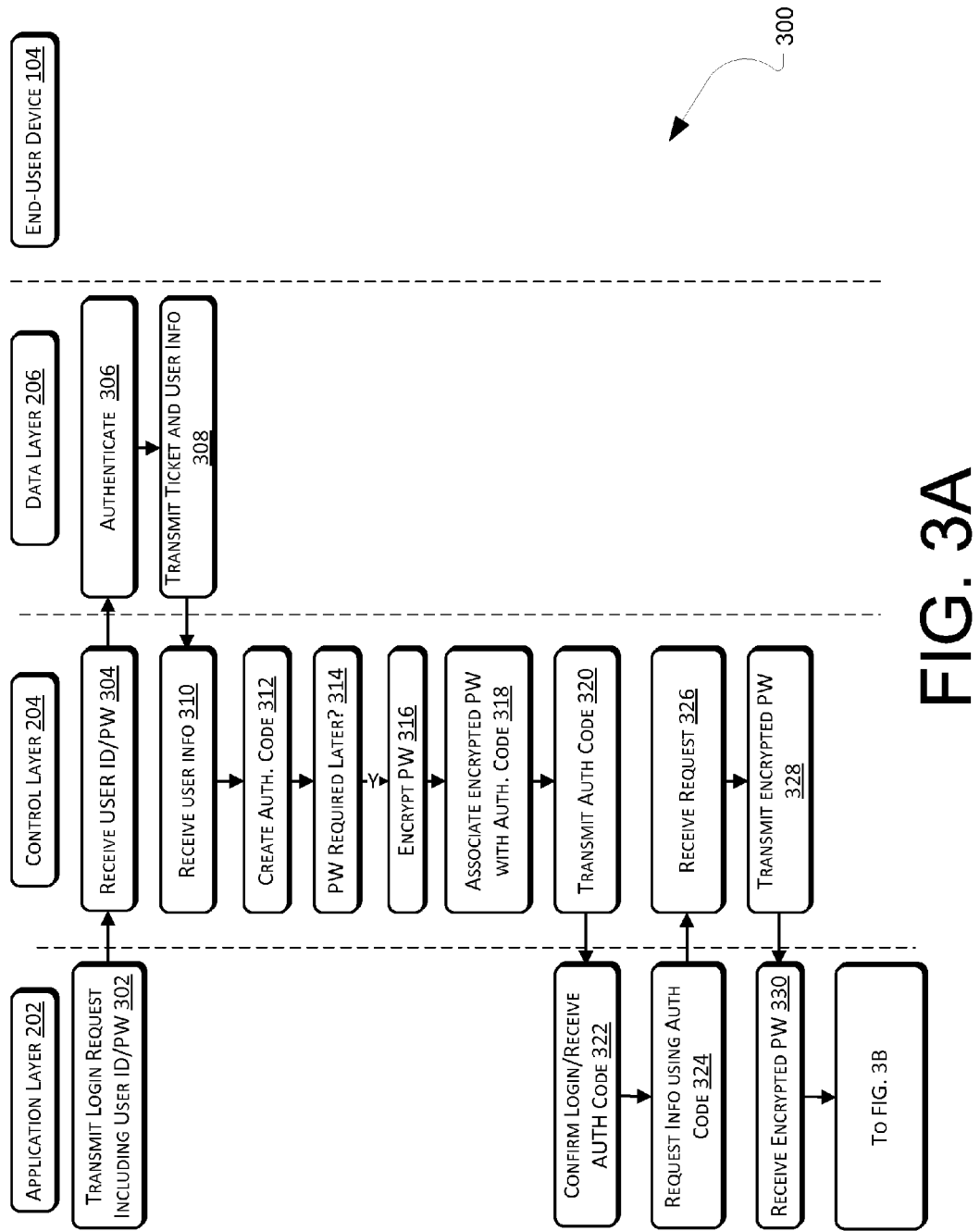
Figure 4:
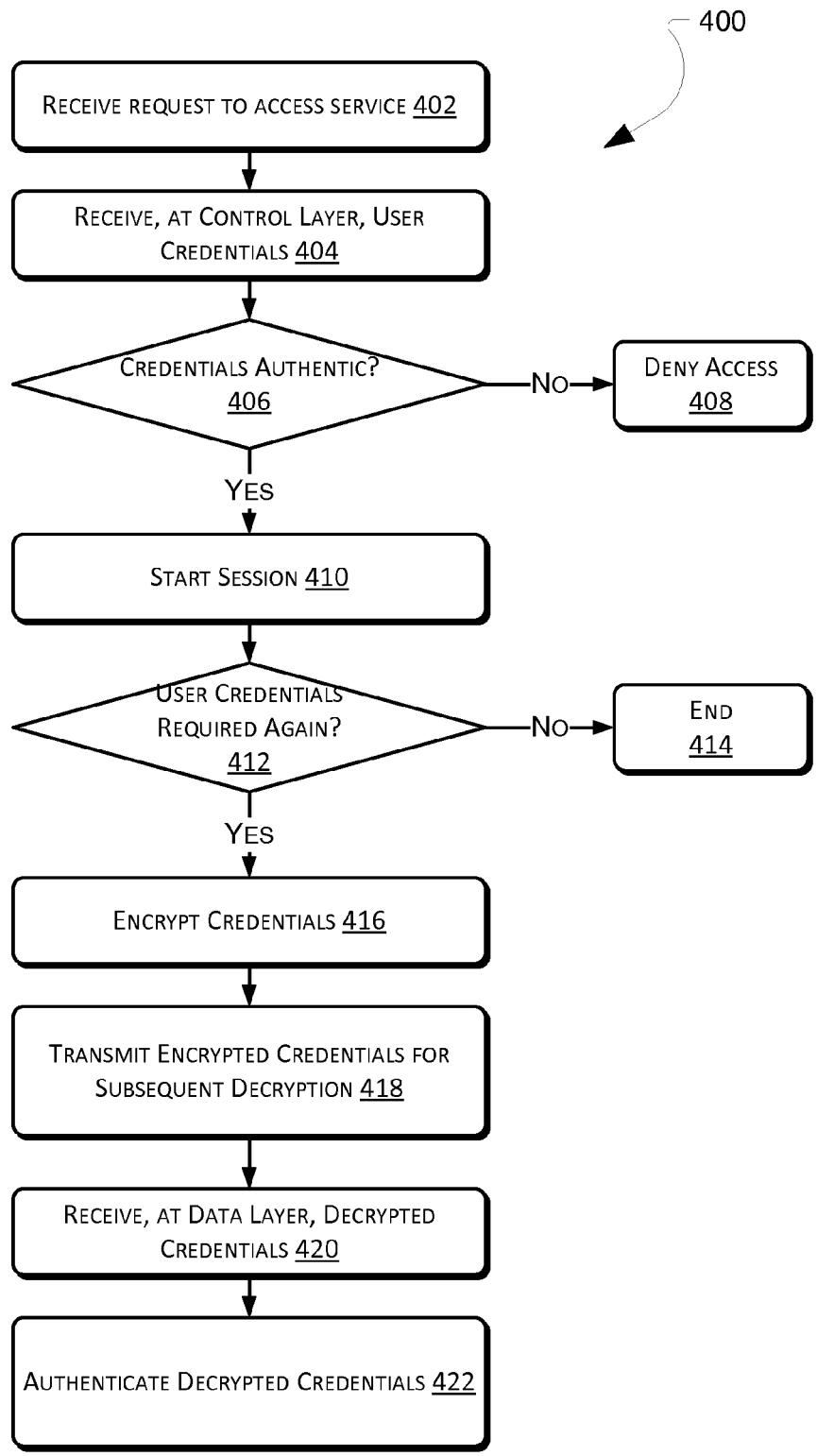
FIG. 4 illustrates a flow diagram of an example process for user authentication in an environment such as that illustrated in FIG. 1.
Figure 5:
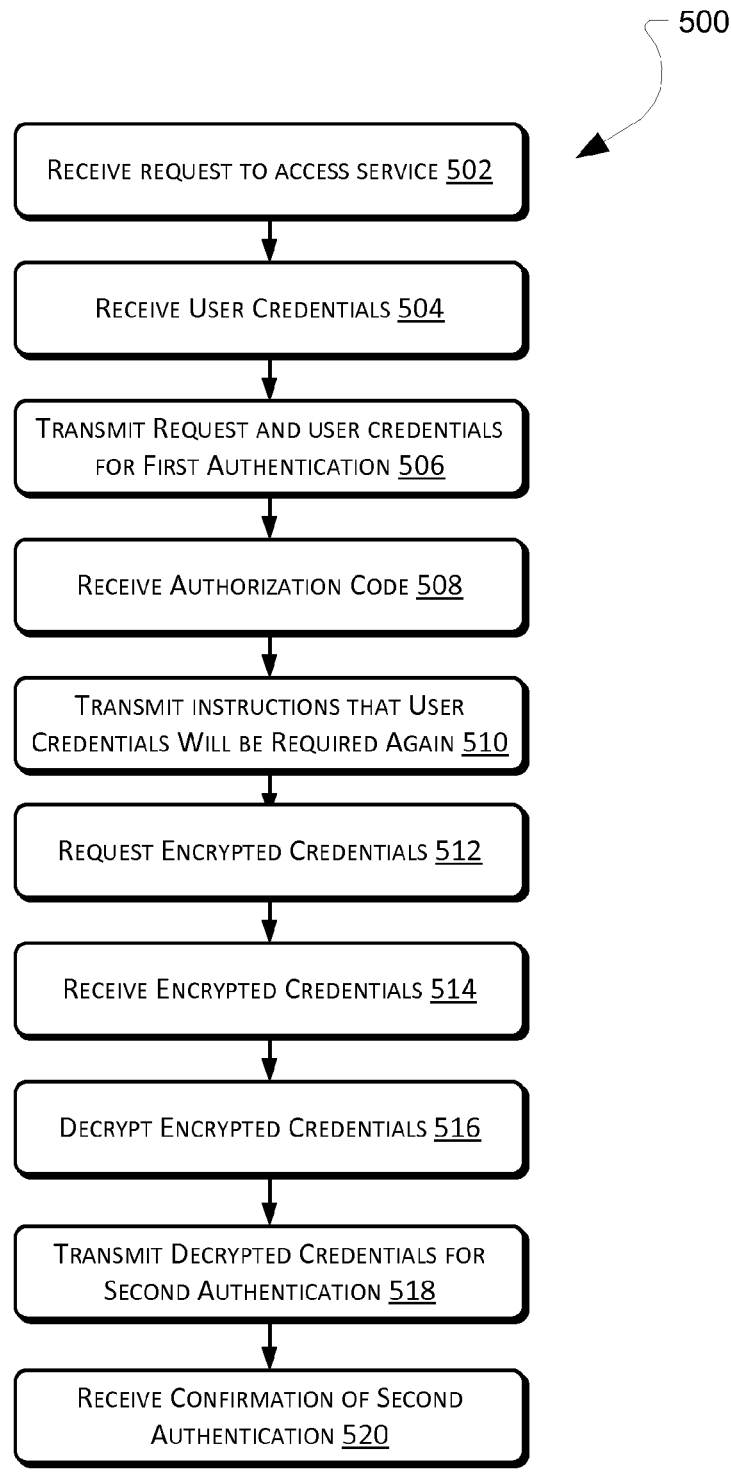
FIG. 5 illustrates a flow diagram of another example process for user authentication in an environment such as that illustrated in FIG. 1.

FIGS. 3A and 3B, 4, and 5 illustrate various processes 300 with obtaining the aforementioned first and second authentications. FIGS. 3A and 3B, for example, illustrate a flow diagram of an example process for authenticating a user using the application layer 202, the control layer 204, the data layer 206, and the user device 104. FIG. 4 illustrates a flow diagram of an example process 400 for authenticating a user, such as at the control layer 204. FIG. 5 illustrates a flow diagram of an example process 500 for creating a session for a user, such as at the application layer 202.

The processes 300, 400, and 500 and other processes described herein are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

The description of the various processes may include certain transitional language and directional language, such as "then," "next," "thereafter," "subsequently," "returning to," "continuing to," "proceeding to," etc. These words, and other similar words, are simply intended to guide the reader through the graphical illustrations of the processes and are not intended to limit the order in which the process steps depicted in the illustrations may be performed.

Additionally, as will be appreciated by a person having ordinary skill in the art with the benefit of this disclosure, one or more of the various process steps depicted in FIGS. 3A through 5 may be performed by a layer or device other than as illustrated.

As stated above, FIGS. 3A and 3B illustrate a flow diagram of an example process, designated 300, to authenticate a user, using the application layer 202, the control layer 204, the data layer 206, and the user device 104. Beginning at 302, the process 300 transmits a login request, including a user ID and a password, to the control layer 204. Although in the example process 300, a user ID and password are transmitted by the application layer 202, user credentials in addition to or instead of the ID and password may be used. As used herein, user credentials generally refer to any information that identifies a user or user device and/or any information that the user or user device may use for authentication or authorization purposes. A user ID, user identifier and similar terms generally refer to any information that identifies a user or user device, including, but not limited to, a user name, an account number, and the like. Although not illustrated, the user credentials may be first received at the application layer 202 from the user device 104, via a user interface.

At 304, the control layer 204 receives the user ID and password from the application layer 202 and attempts to create a session. In the illustrated implementation, the user ID and password are transmitted to the data layer 206, which authenticates the user ID and password at 306. For example, 306 may include attempting to match the user credentials to user credentials stored in a directory on the data layer 206 or accessible by the data layer 206. In another implementation, the control layer 204 may present the user credentials to a key distribution center, such as a Kerberos key distribution center. At 308, the process 300 has determined that the user credentials are authentic and access is granted to the user. In this example, the user credentials have been authenticated via the control layer 204—a first authentication.

Also upon authentication, the data layer transmits at 308 and the control layer 204 receives at 310, confirmation of the authentication. This confirmation may be in the form of a ticket. Also at 308 and 310, additional information about the user, maintained on the data layer, may be transmitted by the data layer and received by the control layer. The user information may include metadata associated with the user, web tokens for activating and or refreshing the user's session, Kerberos tokens for accessing the session from different user devices or accessing different application, and/or any other information. Upon receipt, the control layer 204 may store the user information, i.e., at the control layer 204.

At 312, the control layer 204 generates an authorization code, such as using the authorization code generating module 132. The authorization code may be associated with the user information received at 310.

At 314, the control layer 204 determines whether the password or other user credentials will be required in the future. For example, the control layer may query the application layer 202 about whether the specific application or service accessed by the user will also require the user device to communicate directly with the data layer 206. In other implementations, the control layer 204 may store information about applications and services, consult that information to determine whether the password will be required later. If the password is not required later, e.g., because the application does not require that the end-user device 104 be domain-joined to the data layer 206, a session is maintained at the control layer 204.

However, if it is determined that the password will be required later, the password is encrypted at 316. In one implementation, the password may be encrypted with a key specific to the application or service. For example, the password may be encrypted with a public key of the application or service. At 318, the encrypted password is associated with the authorization code and at 320 the authorization code is transmitted to the application layer.

At 322, the application layer 202 receives the confirmation that the user device has been logged in, which confirmation may include the authorization code 322. Although not illustrated, the application layer 202 may confirm the login with the end-user device 104. The application layer 202 may exchange the authorization code for additional information about the session. For example, at 324 the application layer 202 requests information about the authorization code, at 326 the control layer 204 receives the request, and at 328 the control layer 204 transmits the requested information. The information may include any of the information received from the directory at 310. As illustrated, the information also includes the encrypted password, and at 330 the application layer 202 receives the encrypted password. In different implementations, the control layer 204 may transmit any or all of the authorization code, the encrypted password and the user information to the application layer in any number of steps. For example, instead of transmitting only the authorization code at 320, the control layer could also transmit the encrypted credentials and/or the user information.

Turning now to FIG. 3B, the application layer 202, at 332, decrypts the password 332. For example, when the password is encrypted using a public key of a service or application, that service or application uses its private key to decrypt the password. Then, at 334, the application layer 202 transmits the user ID and password to the user device. The application may take precautions to transmit the user ID and decrypted password securely. Upon receiving the user ID and password at 336, the user device, for example, over the domain, requests a login to the data plane at 338. At 340, the data layer 206 attempts to authenticate the user, using the now-decrypted password. 340 may be functionally substantially identical to 306, such that at 340 the user is authenticated—the second user authentication. At 344 the user device receives login confirmation, and the user device has now been authenticated via the control layer 204 and directly via the data layer, i.e., independently of the control layer 204. However, the user has only presented credentials for authentication via the control layer 204.

Referring now to FIG. 4, a flow diagram of an example process for authenticating a user, such as at the control layer 204 and the data layer 206, independently of the control layer 204, is generally designated 400.

Commencing at 402, the process 400 receives a request to access a service or application. In some implementations, the request may come via a service or application, from a user device. At 404, the process 400 also includes receiving user credentials. In some implementations, the request to access the service may also include the user credentials. As discussed above, the user credentials may include a user name and password.

At 406, the process 400 attempts to authenticate the user credentials. For example, the received credentials may be compared to stored credentials or presented to a key distribution center for authentication. If the credentials are not authenticated, the process 400 denies the user access to the service. If, however, the credentials are authenticated, the process 400 starts a session for the user at 410.

At 412, the process 400 determines whether the user credentials will be required again. For example, as in implementations discussed above, the user credentials must be authenticated a second time, e.g., for direct access to directories on the data plane.

If the user credentials are not required again, the process 400 ends at 414. In this instance, the user session may continue as in conventional systems. If at 412 the process determines that the user credentials will be required again, the process 400 encrypts the credentials at 416. The process 400 may encrypt the credentials using any encryption scheme, although in some implementations the credentials are encrypted using a public key associated with the service or application being accessed.

At 418, the process 400 transmits the encrypted credentials for subsequent authentication, for example, to obtain the second authentication of the user, independent of the control layer. In some implementations, the application layer decrypts the encrypted password and transmits the decrypted credentials to the data layer. At 420, the data layer receives the decrypted credentials, and at 422, the decrypted credentials are authenticated. This second authentication is done independently of the control layer.

Turning now to FIG. 5, 500 generally designates a flow diagram of an example process for logging a user into an application or service, such as at the application layer 202.

Commencing at 502, the process 500 receives a request to access a service and at 504 receives user credentials for authentication to grant the requested access. At 506, the process 500 transmits the request and the user credentials for authentication. For example, in the system 200 of FIG. 2, the user credentials are transmitted to the control layer 204 for authentication on the control layer 204. In the environment 100 of FIG. 1, the authentication subsystem 120 may perform the authentication. Upon authentication of the user credentials, the process 500 receives an authorization code at 506, indicating that a session has commenced.

At 508, the process 500 transmits instructions, e.g., to the control layer 204 or the authentication subsystem 120, that the user credentials will be required again. Although indicated as taking placing after 506, 508 may be performed prior to 506. For example, the instructions that the user credentials will be required again may be transmitted with the request to access the service. In other implementations, the instructions that the user credentials will be required again may be transmitted completely independently of any of the other steps of the process 500. For example, the control layer 204 may know that a service or application requires a second authentication of a user, for example, directly at the data layer 206.

At 510, the process 500 receives encrypted credentials, such as an encrypted password. The encrypted credentials may be received upon exchanging the authorization code received at 506, for example. The process 500 then decrypts the encrypted credentials at 512 and transmits the decrypted credentials for a second authentication at 514. The process 500 may conclude by receiving a confirmation of the second authentication.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which may represent one or more operations that may be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations may be executed in any order, combined in any order, subdivided into multiple sub-operations, and/or executed in parallel to implement the described processes. The described processes, or portions thereof, may be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method comprising:
    receiving, at a control layer of a computing resource service provider via an application accessed by a user device, a request to access a service;
    receiving, at the control layer of the computing resource service provider via the application, a user identifier and a password associated with the user identifier for accessing the service;
    obtaining a first authentication of the user identifier and the password using an authentication directory accessible by the computing resource provider, the authentication directory comprising one of a plurality of directories accessible by the computing resource provider;
    at least partly in response to obtaining the first authentication, encrypting the password to create an encrypted password;
    transmitting the encrypted password to the application accessed by the user device, wherein the application is configured to decrypt the encrypted password to create a decrypted password and transmit the decrypted password to the user device;
    receiving, from the user device, at a data layer of the computing resource provider, and independently of the control layer, the decrypted password; and
    obtaining a second authentication of the decrypted password.

2. The method of claim 1, further comprising determining that the password is required to obtain the second authentication, and
    wherein the encrypting the password is carried out at least partly in response to the determining that the password is required to obtain the second authentication.

3. The method of claim 1, further comprising receiving a token from one of the plurality of directories at least partly in response to receiving the first authentication, the token allowing for additional access, via the application, to the computing resource service provider.

4. The method of claim 1, further comprising generating an authorization code and associating the encrypted password with the authorization code.

5. The method of claim 1, wherein the obtaining the first authentication comprises transmitting the user name and the password to an agent, and the agent is configured to correspond with the authentication directory to authenticate the user name and the password.

6. A system comprising:
    a control layer accessible by a user device via an application; and
    a data layer having a plurality of directories and accessible by the application via the control layer, upon a first authentication of user credentials, and by the user device independent of the control layer, upon a second authentication of the user credentials, the plurality of directories including at least an authentication directory,
    wherein the control layer comprises one or more computing devices programmed to implement:
        a network interface configured to receive, from the application, a request to access a service by a user device, and the user credentials associated with the user device requesting access to the service;
        an authentication module configured to obtain the first authentication of the user device from the authentication directory; and
        an encryption module configured to, at least partly in response to obtaining the first authentication of the user credentials, encrypt at least a portion of the user credentials to create encrypted user credentials, wherein the network interface is further configured to transmit, to the application, the encrypted user credentials, and wherein the encrypted user credentials are decrypted and presented to the data layer to obtain the second authentication of the user device.

7. The system of claim 6, wherein the authentication directory comprises a key distribution center, the key distribution center generates a ticket upon an authentication of user credentials, and the authentication module is configured to obtain the ticket as the first authentication of the user device.

8. The system of claim 7, wherein the ticket is a Kerberos ticket.

9. The system of claim 6, wherein the user device is one of a plurality of networked devices and each of the plurality of networked devices is registered with one or more directories on the data layer to access the data layer independently of the control layer.

10. The system of claim 6, wherein the encryption module is further configured to encrypt the at least a portion of the user credentials using a key associated with the application.

11. The system of claim 10, wherein one of the plurality of directories stores the key associated with the application.

12. The system of claim 10, wherein the key associated with the application comprises a public key of the application.

13. The system of claim 10, wherein the key is rotated by the application.

14. The system of claim 6, wherein the data layer further comprises an agent configured to facilitate communication between the first subsystem and the directory subsystem.

15. The system of claim 6, wherein the control layer is further configured to implement an authorization code generation module for generating an authorization code at least partly in response to the first authentication.

16. The system of claim 15, wherein the authorization code is associated with the encrypted user credentials.

17. A computer-implemented method comprising:

receiving, from a user device, a request to access an application provided by a computing resource service provider, wherein the application requires that the user device is authenticated, via a first authentication of a password, to create a session with the application and access one or more directories during the session, and authenticated, via a second authentication of the password, to access the one or more directories independently of the session;

receiving, from the user device, the password;

transmitting, to an authentication module, the password;

receiving, from the authentication module, the first authentication of the user credentials;

receiving, at least in part in response to an indication that the password will be required to obtain the second authentication, from the authentication module, an encrypted password comprising the password encrypted using a key associated with the application;

decrypting the encrypted password to obtain a decrypted password; and transmitting the decrypted password to the user device, wherein the decrypted password is used by the user device to obtain the second authentication.

18. The method of claim 17, wherein the user device is joined by a domain to the one or more directories to access the one or more directories independently of the session.

19. The method of claim 17, wherein the password is encrypted with a public key associated with the application and wherein the decrypting the encrypted password comprises decrypting the encrypted password with the private key of the application.

20. The method of claim 17, further comprising:

receiving, from the authentication module, an authorization code; and exchanging the authorization code for one or more tokens, wherein the encrypted password is received at least in part in response to exchanging the authorization code.

* * * * *